United States Patent
Ferguson

[11] Patent Number: 5,820,248
[45] Date of Patent: Oct. 13, 1998

[54] FIBER OPTIC CHRISTMAS TREE

[76] Inventor: Raymond K. Ferguson, 372 Maurepas Crescent Winnipeg, Manitoba, Canada, R3N 0L3

[21] Appl. No.: 905,702

[22] Filed: Aug. 4, 1997

[51] Int. Cl.⁶ .................. F21P 1/02; F21V 7/04
[52] U.S. Cl. ............... 362/123; 362/32; 362/122
[58] Field of Search ............... 362/31, 32, 122, 362/123

[56] References Cited

U.S. PATENT DOCUMENTS

| | | | |
|---|---|---|---|
| 2,708,324 | 5/1955 | Wedden | 362/123 |
| 2,857,506 | 10/1958 | Minteer | 362/123 |
| 3,465,139 | 9/1969 | Siegal | 362/123 |
| 3,532,874 | 10/1970 | Rosenast | 362/123 |
| 3,536,908 | 10/1970 | Oster | 362/123 |
| 3,564,233 | 2/1971 | Cox et al. | 362/123 |
| 3,641,335 | 2/1972 | Wall | 362/32 |
| 3,766,376 | 10/1973 | Sadacca et al. | 362/123 |
| 3,878,503 | 4/1975 | Martin | 362/32 |
| 4,060,722 | 11/1977 | Foley | 362/123 |
| 4,068,118 | 1/1978 | Carrington | 362/123 |
| 4,364,102 | 12/1982 | Huppert et al. | 362/123 |
| 4,777,571 | 10/1988 | Morgan | 362/123 |
| 4,858,086 | 8/1989 | Pietrantonio et al. | 362/123 |
| 5,058,985 | 10/1991 | Davenport et al. | 362/32 |
| 5,104,608 | 4/1992 | Pickering | 362/123 |
| 5,226,709 | 7/1993 | Labranche | 362/123 |
| 5,422,797 | 6/1995 | Shattan | 362/123 |
| 5,558,422 | 9/1996 | Sanford | 362/123 |
| 5,702,170 | 12/1997 | Broderick | 362/123 |

*Primary Examiner*—Sandra L. O'Shea
*Assistant Examiner*—Matthew J. Spark

[57] ABSTRACT

A fiber optic Christmas tree is provided including an artificial tree trunk with a plurality of hollow tubular sections. Each section is coupled in axial alignment. Also included is a plurality of fiber optic cables situated within the hollow sections of the tree trunk which are adapted to transfer light to fiber optic cables of an adjacent section upon the releasable coupling thereof. The fiber optic cables extend outwardly from an associated bore in a corresponding section of the tree trunk for emitting light therefrom upon the application of light to the associated fiber optic cables. Further provided is a base having a bulb assembly including a bulb situated within the base for applying light to the fiber optic cables upon the receipt of power.

1 Claim, 3 Drawing Sheets

FIBER OPTIC CHRISTMAS TREE

BACKGROUND OF THE INVENTION

1. Field of the Invention

The present invention relates to a fiber optic Christmas tree and more particularly pertains to provide a Christmas tree that is both safe and easily stored when not in use.

2. Description of the Prior Art

The use of fiber optic trees is known in the prior art. More specifically, fiber optic trees heretofore devised and utilized for the purpose of providing a fiber optically illuminated Christmas tree are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,104,608 to Pickering; U.S. Pat. No. 5,226,709 to Labranche; U.S. Pat. No. Des. 351,810 to Lange et al.; U.S. Pat. No. 4,878,157 to Koch; U.S. Pat. No. 4,858,086 to Pietrantonio et al.; and U.S. Pat. No. 5,422,801 to Sangalli, Jr.

In this respect, the fiber optic Christmas tree according to the present invention substantially departs from the conventional concepts and designs of the prior art, and in so doing provides an apparatus primarily developed for the purpose of providing a Christmas tree that is both safe and easily stored when not in use.

Therefore, it can be appreciated that there exists a continuing need for a new and improved fiber optic Christmas tree which can be used for providing a Christmas tree that is both safe and easily stored when not in use. In this regard, the present invention substantially fulfills this need.

SUMMARY OF THE INVENTION

In view of the foregoing disadvantages inherent in the known types of fiber optic trees now present in the prior art, the present invention provides an improved fiber optic Christmas tree. As such, the general purpose of the present invention, which will be described subsequently in greater detail, is to provide a new and improved fiber optic Christmas tree which has all the advantages of the prior art and none of the disadvantages.

To attain this, the present invention essentially comprises an artificial tree trunk. Such tree trunk includes a plurality of hollow tubular sections. Each section has a different diameter and is coupled in axial alignment with an adjacent section. See FIG. 1. A plurality of primary branches are hingably coupled to a periphery of the associated sections of the tree trunk. Such branches are adapted for pivoting between a vertical orientation in abutment with the associated section of the tree trunk and a horizontal orientation positioned perpendicular with respect to the associated section of the tree trunk. With reference still to FIG. 1, a plurality of secondary branches are coupled to each primary branch and depend downwardly therefrom at a predetermined acute angle. A plurality of bores are formed in the sections below each primary branch. The artificial tree trunk further includes a plurality of radially extending bristles coupled to each primary and secondary branch. With reference now to FIG. 8, a plurality of fiber optic cables are situated within the hollow sections of the tree trunk. Such cables are adapted to transfer light to fiber optic cables of an adjacent section. The fiber optic cables have various diameters wherein fiber optic cables located adjacent a center axis of the tree trunk have a smaller diameter than those located distant the center axis. The fiber optic cables extend outwardly from an associated bore in a corresponding section of the tree trunk. Further, the cables extend along the primary branch located above the bore from which the fiber optic cable exits. As specifically depicted in FIG. 7, each fiber optic cable is spliced to further extend along each secondary branch and terminates in bundle of 30 smaller fiber optic cables for emitting light therefrom upon the application of light to the associated fiber optic cables. As shown in FIG. 1, a top fiber optic bundle is provided having a base screwably coupled to a uppermost section of the tree trunk. The top fiber optic bundle has a plurality of fiber optic cables adapted to emit light upon the application of the light to the fiber optic cables situated within the sections of the tree trunk. With reference to FIGS. 4 & 5, a base is included having a generally disk-shaped configuration with a top face, a bottom face, and a periphery formed therebetween defining an interior space. The base has a threaded bore formed in a central extent of the top face thereof for releasably receiving a bottommost section of the tree trunk. A bulb assembly includes a bulb situated within the interior space of the base below the threaded bore for applying light to the fiber optic cables situated within the sections of the tree trunk upon the receipt of power. The bulb assembly further has a semi-spherical reflector positioned about the bulb for focusing the light emitted therefrom toward the threaded bore. For allowing the escape of heat generated by the bulb, the base further has a plurality of air vents formed in both the top face and bottom face thereof. As best shown in FIG. 4, a plurality of feet are formed on the bottom face of the base for elevating the bottom face thus allowing the escape of heat from the air vents thereof. Lastly, a mechanized color wheel assembly is included. Such assembly includes a translucent disk having a plurality of differently colored sections. The translucent disk has a vertical axle pivotally coupled to the bottom face of the base within the interior space thereof. A first gear is coaxially coupled to the axis. Further, the translucent disk is situated between the bulb and the threaded bore of the base for filtering the light emitted from the bulb. The color wheel assembly further includes a motor with a second gear engaged with the first gear for effecting rotation of the translucent disk upon the receipt of power.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fiber optic Christmas tree which has all the advantages of the prior art fiber optic trees and none of the disadvantages.

It is another object of the present invention to provide a new and improved fiber optic Christmas tree which may be easily and efficiently manufactured and marketed.

It is a further object of the present invention to provide a new and improved fiber optic Christmas tree which is of a durable and reliable construction.

An even further object of the present invention is to provide a new and improved fiber optic Christmas tree which is susceptible of a low cost of manufacture with regard to both materials and labor, and which accordingly is then susceptible of low prices of sale to the consuming public, thereby making such fiber optic Christmas tree economically available to the buying public.

Still yet another object of the present invention is to provide a new and improved fiber optic Christmas tree which provides in the apparatuses and methods of the prior art some of the advantages thereof, while simultaneously overcoming some of the disadvantages normally associated therewith.

Still another object of the present invention is to provide a Christmas tree that is both safe and easily stored when not in use.

Lastly, it is an object of the present invention to provide a new and improved fiber optic Christmas tree is provided including an artificial tree trunk with a plurality of hollow tubular sections. Each section is coupled in axial alignment. Also included is a plurality of fiber optic cables situated within the hollow sections of the tree trunk which are adapted to transfer light to fiber optic cables of an adjacent section upon the releasable coupling thereof. The fiber optic cables extend outwardly from an associated bore in a corresponding section of the tree trunk for emitting light therefrom upon the application of light to the associated fiber optic cables. Further provided is a base having a bulb assembly including a bulb situated within the base for applying light to the fiber optic cables upon the receipt of power.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
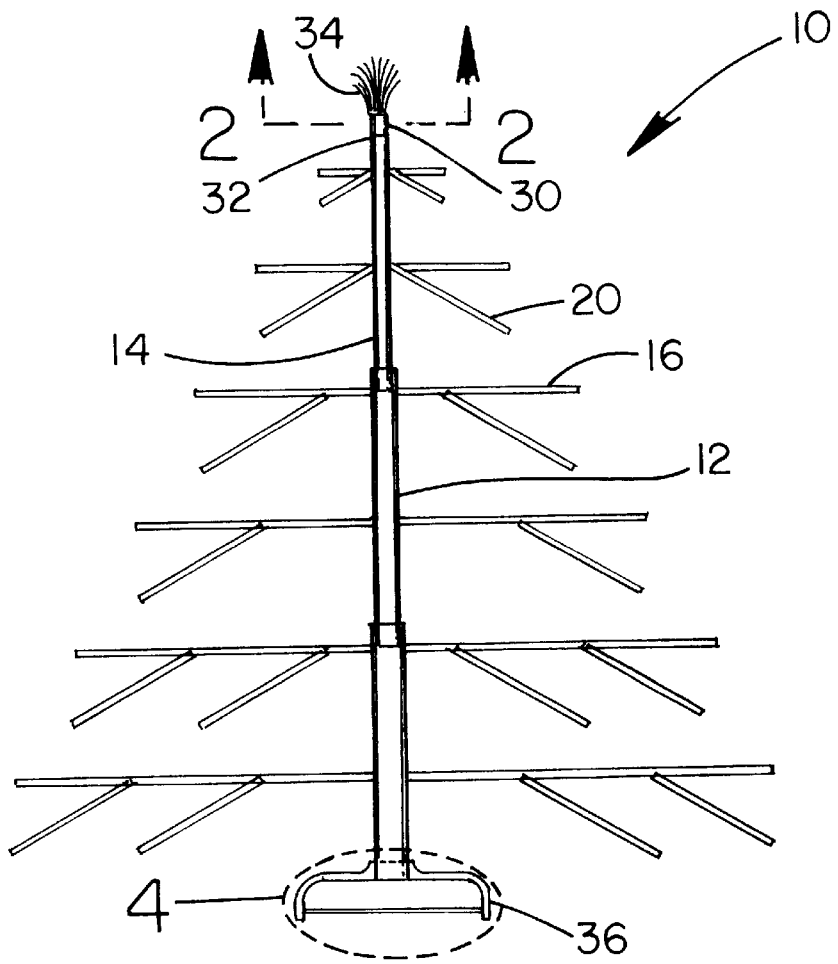
FIG. 1 is an illustration of the preferred embodiment of the fiber optic Christmas tree constructed in accordance with the principles of the present invention.
Figure 2:
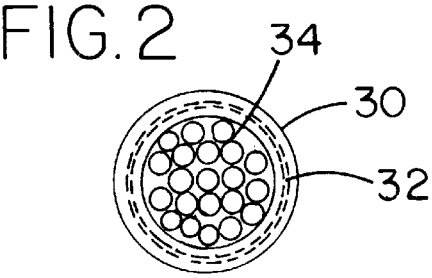
FIG. 2 is a cross-sectional view of the top bundle of fiber optic cables taken along line 2—2 shown in FIG. 1.
Figure 3:
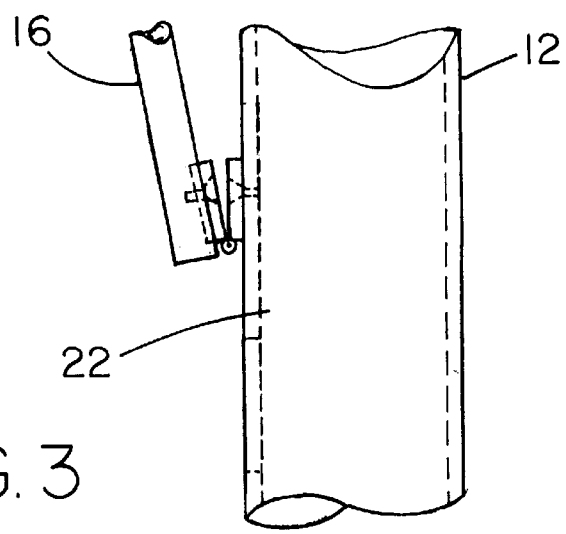
FIG. 3 is a sectional view of the tree trunk and one of the primary branches thereof.

With reference now to the drawings, and in particular to FIG. 1 thereof, a new and improved fiber optic Christmas tree embodying the principles and concepts of the present invention and generally designated by the reference numeral 10 will be described.

The present invention, the new and improved fiber optic Christmas tree, is comprised of a plurality of components. Such components in their broadest context include an artificial tree trunk, a plurality of fiber optic cables, a base, and a color wheel assembly. Such components are individually configured and correlated with respect to each other so as to attain the desired objective.

Figure 7:
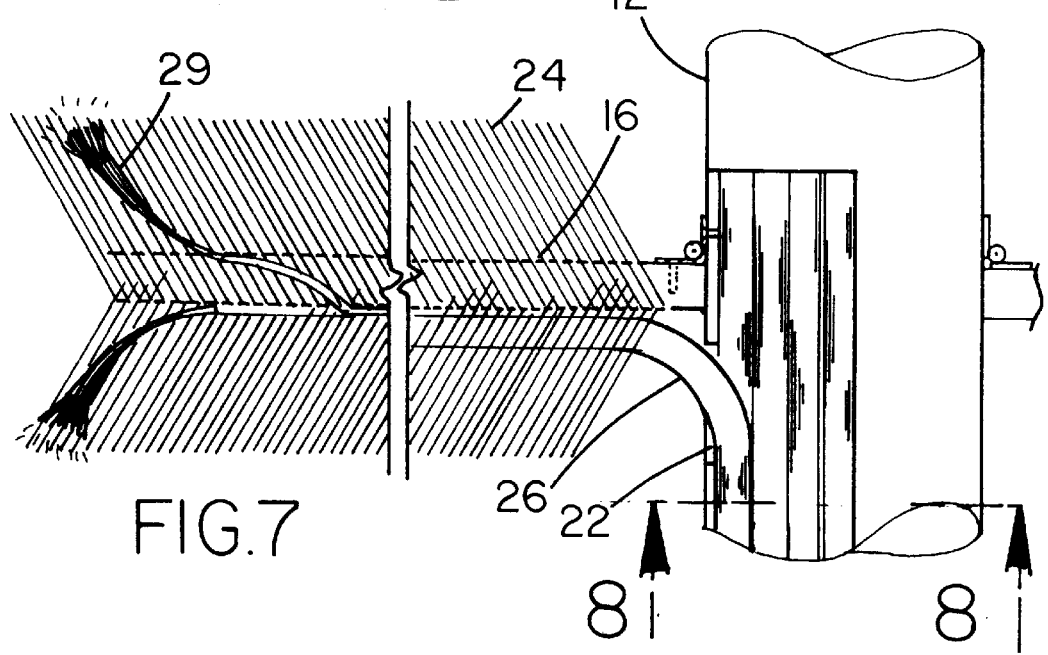
FIG. 7 is a side view of one of the primary branches of the present invention.

More specifically, it will be noted that the system 10 of the present invention includes an artificial tree trunk 12. Such tree trunk includes a plurality of hollow tubular sections 14. Each section has a different diameter and is coupled in axial alignment with an adjacent section. See FIG. 1. A plurality of primary branches 16 are hingably coupled to a periphery of the associated sections of the tree trunk. Such branches are adapted for pivoting between a vertical orientation in abutment with the associated section of the tree trunk and a horizontal orientation positioned perpendicular with respect thereto. In the preferred embodiment, four branches are attached to each of a total of three sections. With reference still to FIG. 1, a pair of secondary branches 20 are coupled to each primary branch and depend downwardly therefrom at a predetermined acute angle. As shown in FIG. 7, a plurality of bores 22 are each formed in the sections below each primary branch. The artificial tree trunk further includes a plurality of radially extending bristles 24 coupled to each primary and secondary branch. Each of such bristles are wrapped about the associated branch at a central extent thereof.

Figure 8:
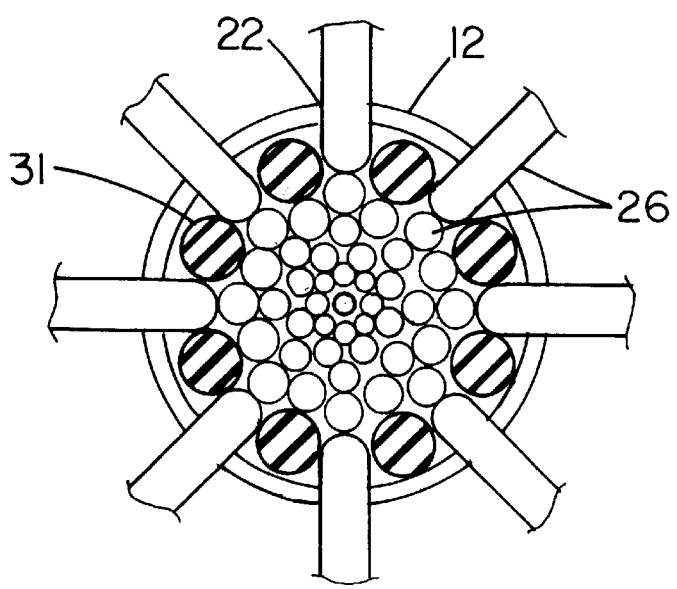
FIG. 8 is a cross-sectional view of the tree trunk taken along line 8—8 shown in FIG. 7.

With reference now to FIG. 8, a plurality of fiber optic cables 26 are situated within the hollow sections of the tree trunk. Such cables are adapted to transfer light to fiber optic cables of an adjacent section. The fiber optic cables have various diameters wherein fiber optic cables located adjacent a center axis of the tree trunk have a smaller diameter than those located distant the center axis. The fiber optic cables extend outwardly from an associated bore in a corresponding section of the tree trunk. Further, the cables extend along the primary branch located above the bore from which the fiber optic cable exits. As depicted in detail in FIG. 7, each fiber optic cable is spliced to further extend along each secondary branch and terminates in bundle 29 of thirty smaller fiber optic cables for emitting light therefrom upon the application of light to the associated fiber optic cables. As shown in FIG. 8, a plurality of opaque soft elastomeric rubber strips 31 are positioned between each of the outer fiber optic cables. It should be noted that in each section of the trunk, the opaque soft elastomeric rubber strips are of a size similar to the outer fiber optic cables which exit the bores formed in the section. To ensure that light is properly transmitted, the difference in diameter of each section is greater than twice the diameter of the outer fiber optic cables of the bottom adjacent section of the tree trunk.

As shown in FIG. 1, a top fiber optic bundle 30 is provided having a base 32 screwably coupled to an uppermost section of the tree trunk. Such base is adapted to constrain the fiber optic cables of the bundle. The top fiber optic bundle has a plurality of fiber optic cables 34 adapted to emit light upon the application of the light to the fiber optic cables situated within the sections of the tree trunk.

Figure 4:
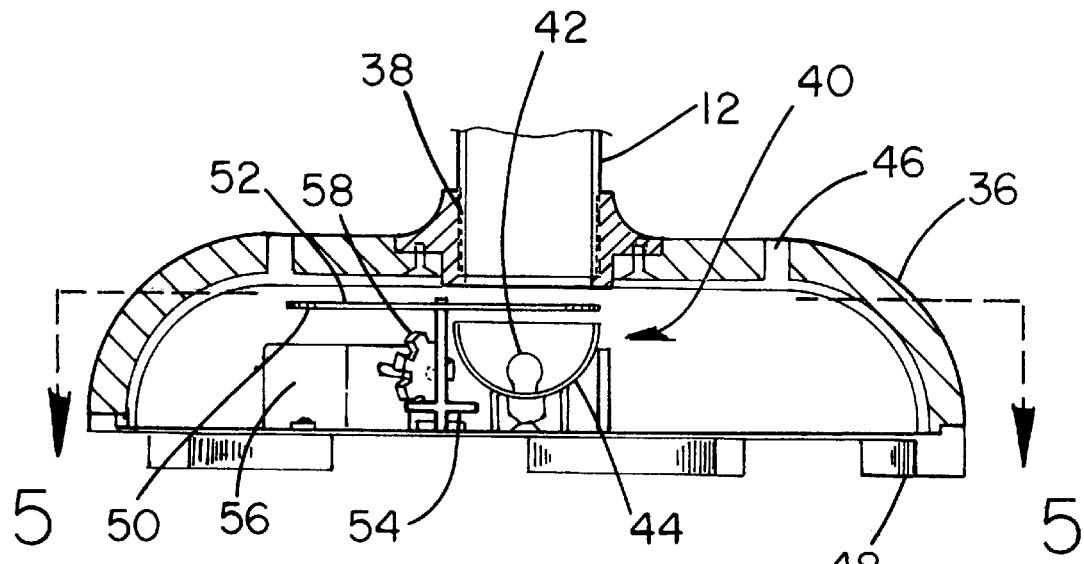
FIG. 4 is a cross-sectional view of the base of the present invention shown in FIG. 1.
Figure 5:
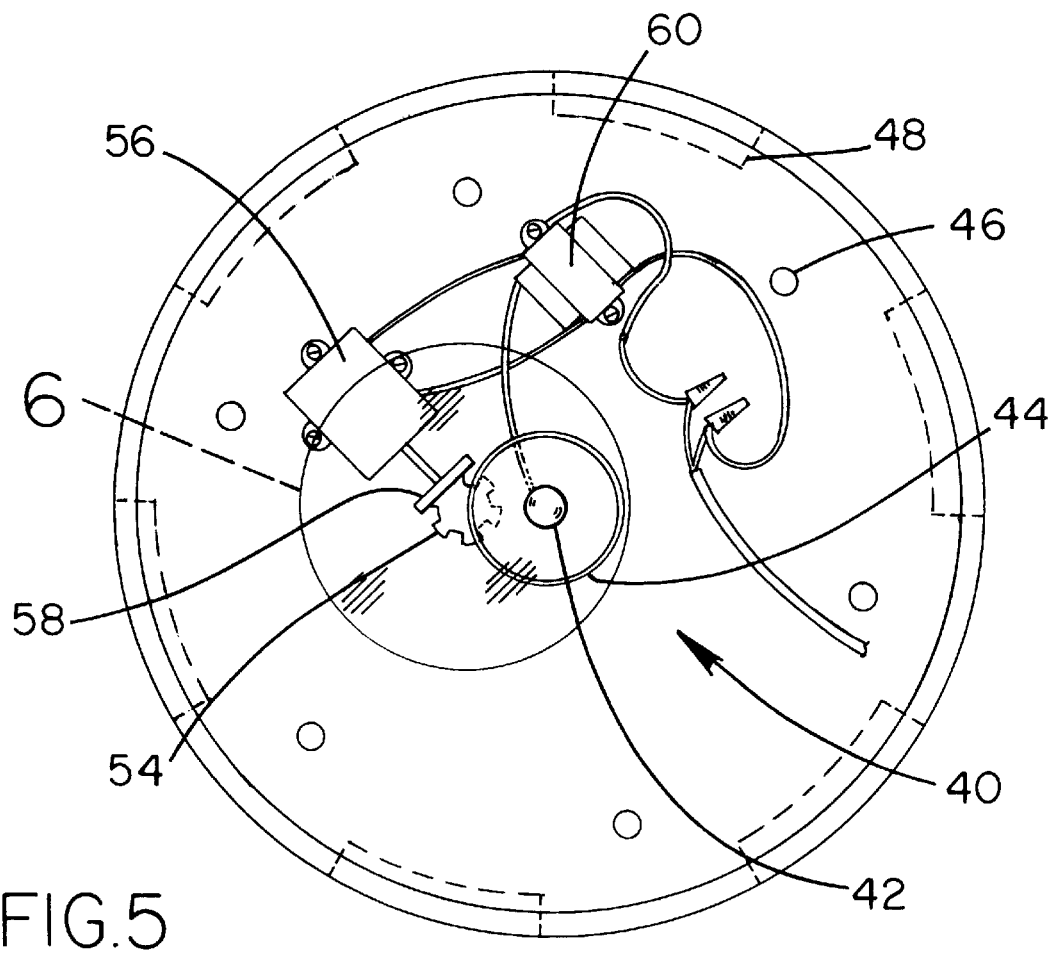
FIG. 5 is a top cross-sectional view of the present invention taken along line 5—5 shown in FIG. 4.
Figure 6:
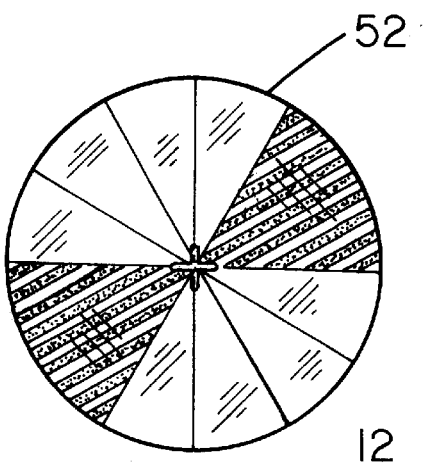
FIG. 6 is a plan view of the translucent color wheel of the present invention.

With reference to FIGS. 4 & 5, a base 36 is included having a generally disk-shaped configuration with a top face, a bottom face, and a periphery formed therebetween defining an interior space. The base has a threaded bore 38 formed in a central extent of the top face thereof for releasably receiving a bottommost section of the tree trunk. A bulb assembly 40 includes a bulb 42 situated within the interior space of the base below the threaded bore for applying light to the fiber optic cables situated within the sections of the tree trunk. The bulb assembly further has a semi-spherical reflector 44 positioned about the bulb for focusing the light emitted therefrom toward the threaded bore. For allowing the escape of heat generated by the bulb, the base further has a plurality of circular air vents 46 formed in both the top face and bottom face thereof. As best shown in FIG. 4, a plurality of feet 48 are formed on the bottom face of the base for elevating the bottom face thus allowing the escape of heat from the air vents thereof.

Lastly, a mechanized color wheel assembly 50 is included. Such assembly includes a translucent disk 52 having a plurality of differently colored sections. At least one of such section has a plurality of radially extending different colored strips. The translucent disk has a vertical axle pivotally coupled to the bottom face of the base within the interior space thereof. A first gear 54 is coaxially coupled to the axis. Further, the translucent disk is situated between the bulb and the threaded bore of the base for filtering the light emitted from the bulb. The color wheel assembly further includes a motor 56 with a second gear 58 engaged with the first gear for effecting rotation of the translucent disk upon the receipt of power. Such power is preferably afforded by a transformer 60 connected to a conventional power receptacle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the united states is as follows:

1. A new and improved fiber optic Christmas tree comprising, in combination:

an artificial tree trunk including a plurality of hollow tubular sections, each tubular section of the tree trunk having a different diameter and coupled in axial alignment with an adjacent one of the tubular sections of the tree trunk, a plurality of primary branches hingably coupled to a periphery of one of the tubular sections of the tree trunk for pivoting between a vertical orientation in abutment with one of the tubular sections of the tree trunk and a horizontal orientation positioned perpendicular with respect to one of the tubular sections of the tree trunk, a plurality of secondary branches coupled to each primary branch and depending downwardly therefrom at a predetermined acute angle, and a plurality of bores formed in the tubular sections of the tree trunk below each primary branch, the artificial tree trunk further including a plurality of radially extending bristles coupled to each primary and secondary branch;

a plurality of fiber optic cables situated within the hollow tubular sections of the tree trunk and adapted to transfer light to fiber optic cables of an adjacent one of the tubular sections of the tree trunk, the fiber optic cables having various diameters wherein fiber optic cables located adjacent a center axis of the tree trunk have a smaller diameter than those located distant the center axis, the fiber optic cables extending outwardly from an associated bore in a corresponding one of the tubular sections of the tree trunk and further extending along the primary branch located above the bore from which the fiber optic cable exits wherein each fiber optic cable is spliced to further extend along each secondary branch, each splice of each cable terminating in bundle of 30 smaller fiber optic cables for emitting light therefrom upon the application of light to the associated fiber optic cables, wherein a difference in diameter of each tubular section of the tree trunk is about equal to the diameter of the outer fiber optic cables of a bottom adjacent one of the tubular sections of the tree trunk;

a plurality of soft opaque elastomeric rubber strips situated between each of the fiber optic cables, wherein a diameter of the rubber strips is approximately equal to that of the fiber optic cables;

a top fiber optic bundle having a base screwably coupled to a uppermost tubular section of the tree trunk, the top fiber optic bundle having a plurality of fiber optic cables adapted to emit light upon the application of the light to the fiber optic cables situated within the tubular sections of the tree trunk;

a base having a generally disk-shaped configuration with a top face, a bottom face, and a periphery formed therebetween, the base having a threaded bore formed in a central extent of the top face thereof for releasably receiving a bottommost one of the tubular sections of the tree trunk, a bulb assembly including a bulb situated within an interior space of the base below the threaded bore for applying light to the fiber optic cables situated within the tubular sections of the tree trunk upon the receipt of power, the bulb assembly further having a semi-spherical reflector positioned about the bulb for focusing the light emitted therefrom toward the threaded bore, the base further having a plurality of air vents formed in both the top face and bottom face thereof for allowing the escape of heat generated by the bulb and a plurality of feet formed on the bottom face of the base for elevating the bottom face thus allowing the escape of heat from the air vents thereof;

a mechanized color wheel assembly including a translucent disk having a plurality of differently colored portions, the translucent disk having a vertical axle pivotally coupled to the bottom face of the base with a first gear coaxially coupled thereto, the translucent disk situated between the bulb and the threaded bore of the base, the color wheel assembly further including a motor with a second gear engaged with the first gear for effecting rotation of the translucent disk upon the receipt of power.

* * * * *